(12) United States Patent
Firko et al.

(10) Patent No.: US 9,682,762 B1
(45) Date of Patent: Jun. 20, 2017

(54) STIFFENER WITH SHAPED END TERMINATION

(75) Inventors: Jason L. Firko, Wilmington, DE (US); Christopher J. Bastien, Folsom, PA (US); Matthew Edmunds, Media, PA (US); Nika C. McManus, Drexel Hill, PA (US)

(73) Assignee: THE BOEING COMPANY, Chicago, IL (US)

( * ) Notice: Subject to any disclaimer, the term of this patent is extended or adjusted under 35 U.S.C. 154(b) by 1753 days.

(21) Appl. No.: 12/783,794

(22) Filed: May 20, 2010

(51) Int. Cl.
*B64C 1/06* (2006.01)

(52) U.S. Cl.
CPC ..................... *B64C 1/064* (2013.01)

(58) Field of Classification Search
CPC .. B64C 1/00; B64C 1/06; B64C 1/061; B64C 1/062; B64C 1/064; B64C 2001/0072
USPC ....... 52/309.2, 782.1, 783.11, 783.18, 790.1, 52/793.11, 799.1, 800.1; 428/188, 174; 244/119, 123.1, 123.9, 133
See application file for complete search history.

(56) References Cited

U.S. PATENT DOCUMENTS

| 1,900,824 | A | * | 3/1933 | Lewis | 428/172 |
| 2,473,728 | A | * | 6/1949 | Rutledge | 52/586.1 |
| 2,650,185 | A | * | 8/1953 | Larson et al. | 156/310 |
| 6,849,323 | B2 | * | 2/2005 | Benson et al. | 428/175 |
| 7,527,222 | B2 | * | 5/2009 | Biornstad et al. | 244/120 |
| 7,837,147 | B2 | * | 11/2010 | Liguore et al. | 244/119 |
| 8,042,768 | B2 | * | 10/2011 | Liguore et al. | 244/119 |
| 8,096,503 | B2 | * | 1/2012 | Verweyen | 244/119 |
| 8,157,212 | B2 | * | 4/2012 | Biornstad et al. | 244/119 |
| 2008/0290214 | A1 | * | 11/2008 | Guzman et al. | 244/119 |

OTHER PUBLICATIONS

Specialty Materials, Inc., "Hy-Bor for Advanced Hat-Stiffened Aircraft Structures," retrieved from http://www.specmaterials.com/pdfs/BoeingHatSectionStudy.pdf, accessed Aug. 2, 2012, 17 pages.

* cited by examiner

*Primary Examiner* — Charles A. Fox
*Assistant Examiner* — James Buckle, Jr.
(74) *Attorney, Agent, or Firm* — Yee & Associates, P.C.

(57) ABSTRACT

A stiffener includes a stiffener body having a first stiffener end and a second stiffener end and a generally elliptical stiffener end termination provided in at least one of the first stiffener end and the second stiffener end of the stiffener body.

12 Claims, 4 Drawing Sheets

STIFFENER WITH SHAPED END TERMINATION

TECHNICAL FIELD

The disclosure generally relates to stiffeners for composite structures. More particularly, the disclosure relates to a stiffener having an elliptical end termination which reduces strain in and enhances stability of the stiffener.

BACKGROUND

Composite structures are extensively used in aerospace and other applications due to their high strength-to-weight ratios and amenability to being fashioned in a variety of shapes and contours. In some applications, it may be necessary or desirable to stiffen or stabilize composite structures. One method of stiffening composite structures includes use of a hat stiffener, which has a stiffener cap from which extends a pair of spaced-apart stiffener webs. Stiffener flanges may extend outwardly from the stiffener webs for attachment to the composite structure. The stiffener may eliminate or reduce flexing and bending in the composite structure to which the stiffener is attached.

A stiffener having an elliptical end termination which reduces strain in and enhances stability of the stiffener is desirable for some applications.

SUMMARY

The disclosure is generally directed to a stiffener having an elliptical end termination which reduces strain in and enhances stability of the stiffener. An illustrative embodiment of the stiffener includes a stiffener body having a first stiffener end and a second stiffener end and a generally elliptical stiffener end termination provided in at least one of the first stiffener end and the second stiffener end of the stiffener body.

The disclosure is further generally directed to a composite assembly. An illustrative embodiment of the composite assembly includes a composite structure and at least one stiffener provided on the composite structure and including a stiffener body having a first stiffener end and a second stiffener end and a generally elliptical stiffener end termination provided in at least one of the first stiffener end and the second stiffener end of the stiffener body.

The disclosure is further generally directed to a method of fabricating a stiffener with elliptical end termination. An illustrative embodiment of the method includes providing a stiffener having a first stiffener end and a second stiffener end and providing a generally elliptical stiffener end termination in at least one of the first stiffener end and the second stiffener end.

The features, functions, and advantages that have been discussed can be achieved independently in various embodiments of the present disclosure or may be combined in yet other embodiments further details of which can be seen with reference to the following description and drawings.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
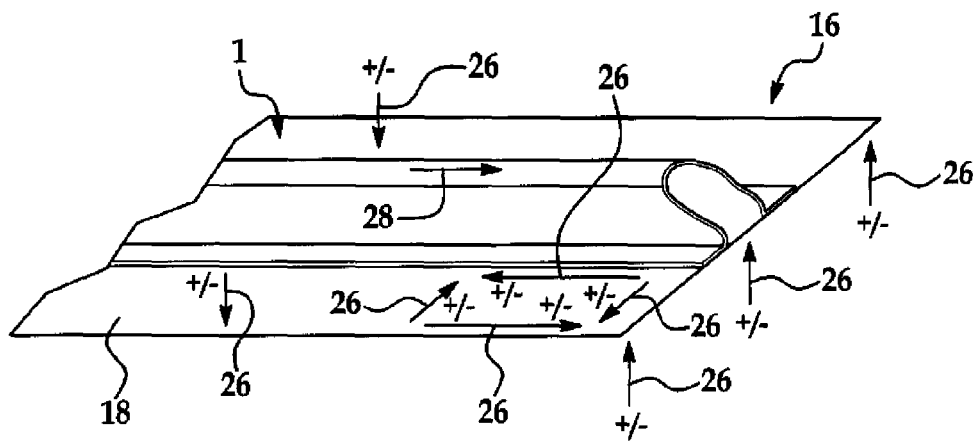
FIG. 1 is an illustration of a perspective view of a pair of stiffeners with elliptical end terminations attached to a composite structure.

Referring to FIGS. 1-5, an illustrative embodiment of the stiffener with elliptical end termination, hereinafter stiffener, is generally indicated by reference numeral 1. As shown in FIG. 1, in some applications at least one stiffener 1 may be attached to a composite structure 18 in a composite assembly 16 to stabilize and eliminate or reduce flexing and bending the composite structure 18. In some applications, the composite structure 18 may be a structure such as a wing panel or other structure used in aerospace applications. However, the stiffener 1 may be suitable for stabilizing a composite structure 18 in any of a variety of alternative applications.

The stiffener 1 may include a stiffener body 10 having a first stiffener end 6 and a second stiffener end (not shown) which is opposite the first stiffener end 6. In some embodiments, the stiffener 1 may be a "hat" type stiffener which is known in the aerospace and other industries for stabilizing a composite structure 18. The stiffener body 10 may have a stiffener cap 4 from which extends a pair of spaced-apart stiffener webs 3. Stiffener flanges 2 may extend outwardly from the respective stiffener webs 3. A stiffener interior 5 may be defined by and between the stiffener webs 3 and the stiffener cap 4. The stiffener interior 5 entrance allows access to fasteners 20, and their installation and maintenance.

Figure 5:
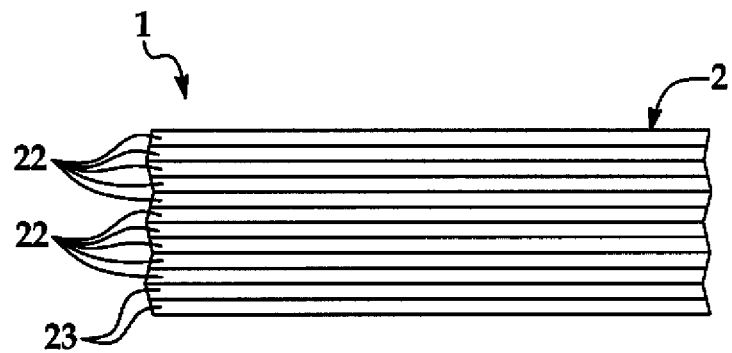
FIG. 5 is an illustration of a cross-section of a portion of a stiffener with elliptical end termination.

As shown in FIG. 5, the stiffener body 10 may be a multi-laminate composite structure. The multi-laminate stiffener body 10 may include at least one tape ply 22 and at least one fabric ply 23. The stiffener body 10 may have multiple tape plies 22 and multiple fabric plies 23. In some embodiments, the stiffener body 10 may have ten tape plies 22 and two fabric plies 23.

Figure 4:
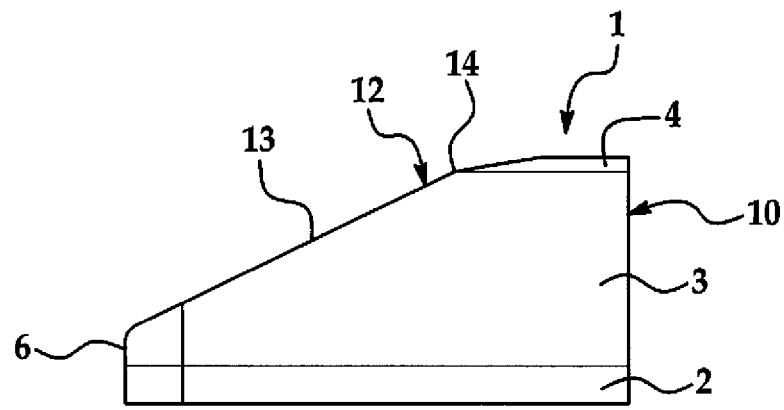
FIG. 4 is an illustration of a side view of a portion of a stiffener with elliptical end termination.

A stiffener end termination 12 may be provided in at least one of the first stiffener end 6 and the second stiffener end 7. The stiffener end termination 12 may be generally elliptical-shaped. As shown in FIG. 4, in some embodiments, the elliptical stiffener end termination 12 may have a pair of termination side edges 13 which extend along the respective stiffener webs 3 and generally slope from the stiffener flanges 2 to the stiffener cap 4 at the first stiffener end 6. At the stiffener cap 4, the termination side edges 13 may be continuous with and smoothly transition to a generally curved or concave termination upper edge 14.

Referring again to FIG. 1, in an exemplary application at least one stiffener 1 may be attached to a composite structure 18 in a composite assembly 16 to stiffen and prevent or reduce flexing and bending of the composite structure 18. In some embodiments, a pair of stiffeners 1 may be provided on the composite structure 18 in the composite assembly 16 in generally parallel, spaced-apart relationship with respect to each other. The stiffener flanges 2 of each stiffener 1 may be attached to the composite structure 18 using fasteners (not shown) and/or other suitable attachment technique which is known to those skilled in the art. As forces 26 are applied to the composite structure 18 during use of the composite assembly 16, the elliptical stiffener end termination 12 may reduce the load 28 which accumulates at the first stiffener end 6 of the stiffener body 10. (FIG. 1 shows general forces 26, however, the structure can be exposed to other load combinations.) Reduction in the accumulated load 28 at the first stiffener end 6 may reduce strain in and enhance stability of the stiffener 1, increasing the effectiveness of the stiffener 1 in resisting the forces 26 applied to the composite structure 18.

Figure 2:
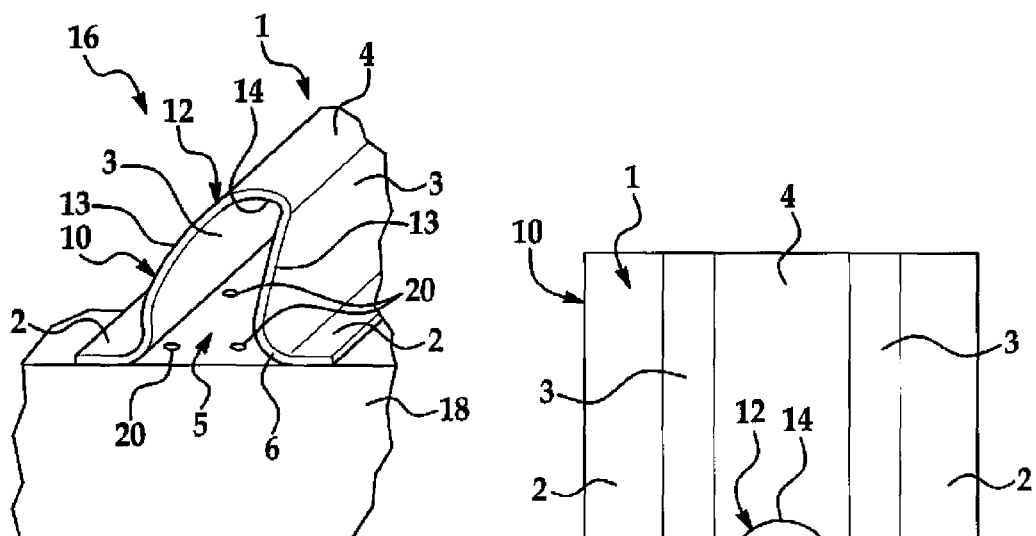
FIG. 2 is an illustration of a sectional perspective view of a stiffener end termination of a stiffener.
Figure 3:
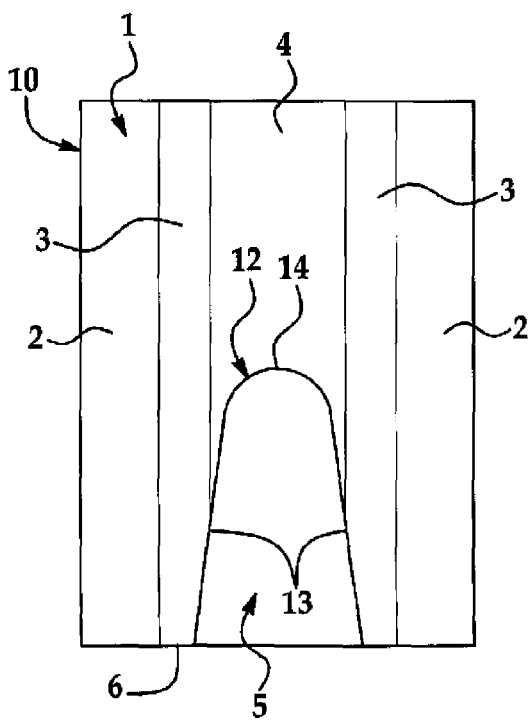
FIG. 3 is an illustration of a top view of a portion of a stiffener with elliptical end termination.

As shown in FIG. 2, in some applications each stiffener 1 may be positioned on the composite structure 18 in such a manner that fasteners 20 are located within the stiffener interior 5 of the stiffener 1 generally beneath the elliptical stiffener end termination 12. Accordingly, the elliptical stiffener end termination 12 may provide personnel easy access to the fasteners 20 for replacement and/or maintenance purposes of the composite structure 18 and/or other components of the composite assembly 16.

Figure 5A:
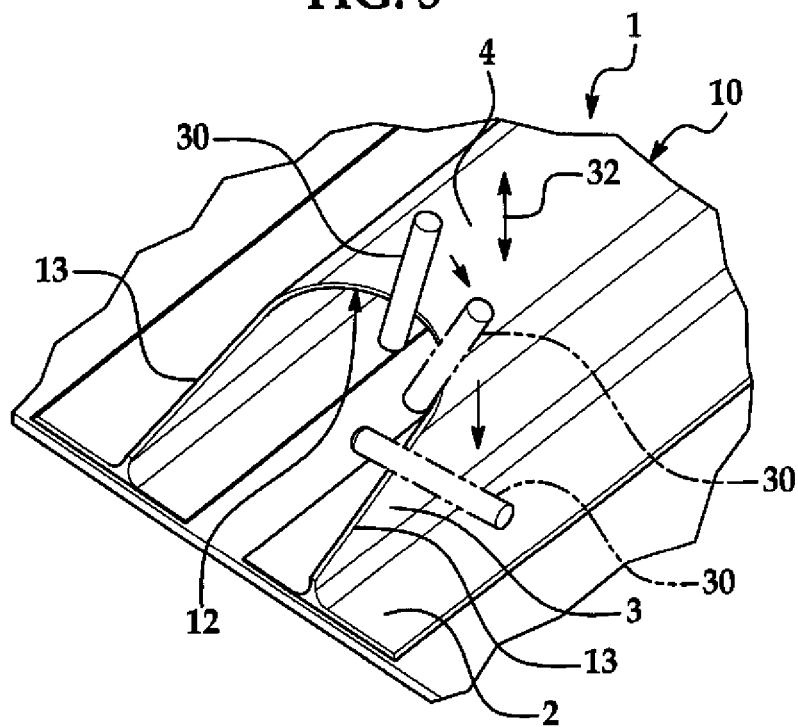
FIG. 5A is an illustration of a side view of a portion of a stiffener with a cutting tool (shown in phantom) cutting an elliptical end termination in the stiffener.
Figure 6:
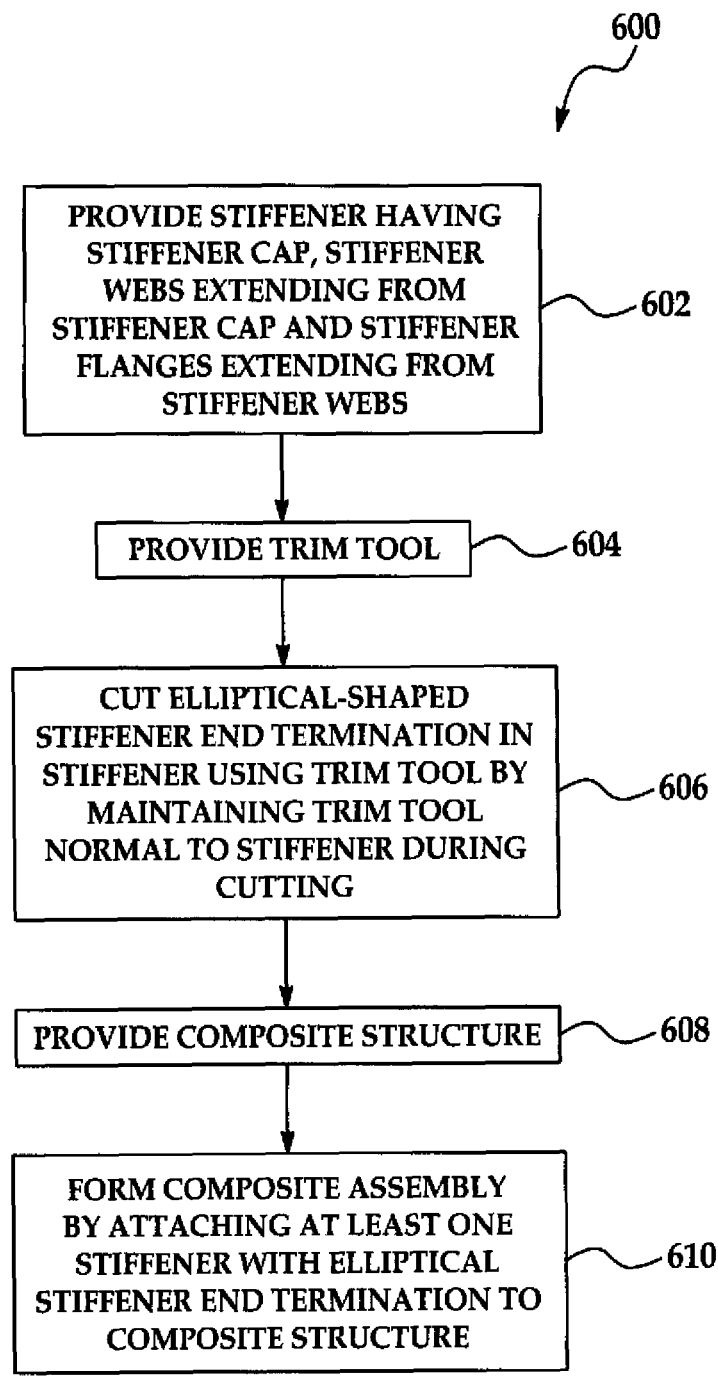
FIG. 6 is an illustration of a flow diagram of a method of fabricating a stiffener with elliptical end termination.

Referring next to FIG. 6 in conjunction with FIG. 5A, a flow diagram 600 of a method of fabricating a stiffener 1 with elliptical end termination 12 is shown. In block 602, a stiffener 1 is provided. In some embodiments, the stiffener 1 may be a hat stiffener with a stiffener body 10 having a stiffener cap 4, spaced-apart stiffener webs 3 extending from the stiffener cap 4 and stiffener flanges 2 extending from the respective stiffener webs 3. The stiffener 1 may be fabricated using conventional composite material fabrication techniques which are well-known to those skilled in the art. The stiffener 1 may be a multi-laminated composite structure. In some embodiments, the stiffener 1 may have at least one tape ply 22 and at least one fabric ply 23. In some embodiments, the stiffener 1 may have ten tape plies 22 and two fabric plies 23.

In block 604, a trim tool 30 may be provided. In block 606, an elliptical-shaped stiffener end termination 12 may be cut in at least one end 6, 7 of the stiffener body 10 of the stiffener 1 using the trim tool 30 by maintaining the trim tool 30 normal 32 to the stiffener 1 during cutting, or perpendicular to the plane of the surface of each stiffener web 3 or the stiffener cap 4 of the stiffener 1 as the trim tool 30 forms the cut. This is shown in FIG. 5A. In some embodiments, the elliptical stiffener end termination 12 may include a pair of termination side edges 13 which extend along the respective stiffener webs 3 and generally slope from the stiffener flanges 2 at the first stiffener end 6 to the stiffener cap 4. At the stiffener cap 4, the termination side edges 13 may be continuous with and smoothly transition to a generally curved or concave termination upper edge 14. In block 608, a composite structure may be provided. In block 610, a composite assembly may be formed by attaching at least one stiffener having an elliptical stiffener end termination to the composite structure.

Figure 7:
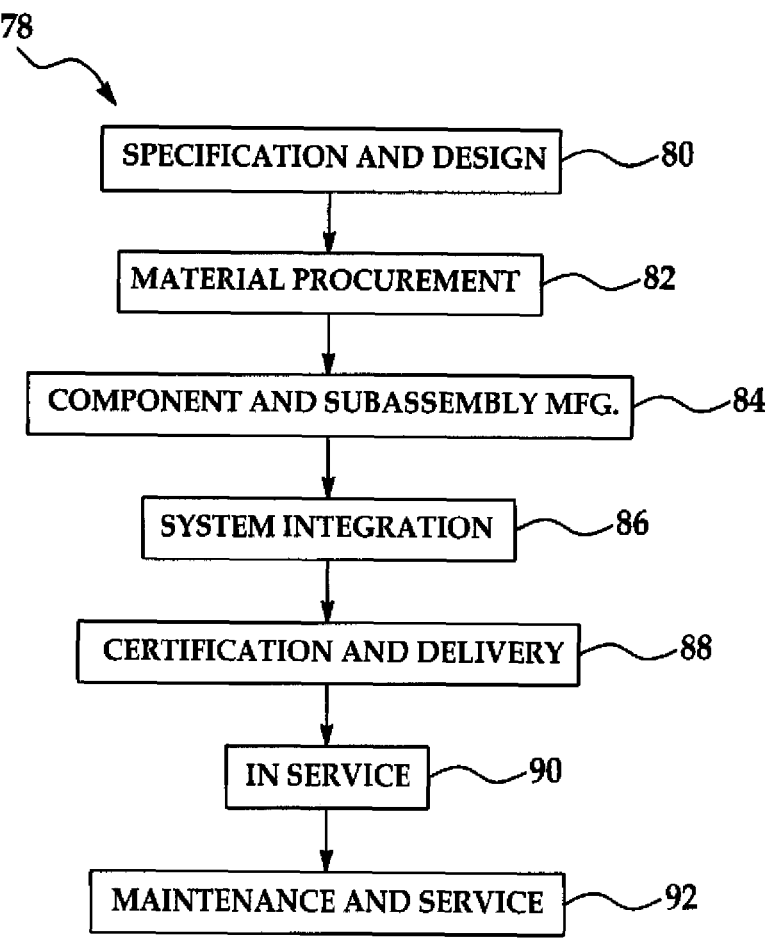
FIG. 7 is a flow diagram of an aircraft production and service methodology.
Figure 8:
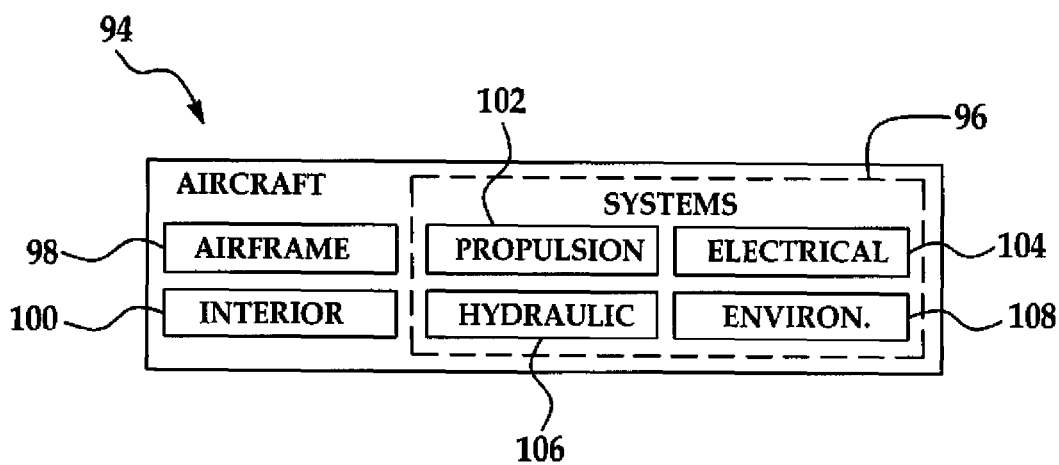
FIG. 8 is a block diagram of an aircraft.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:
1. A stiffener, comprising:
a first flange;
a first web extending at a first angle from the first flange, a first intersection of the first flange and the first web being curved;
a second flange opposite the first flange, the first flange and the second flange forming a plane;
a second web extending at a second angle from the second flange, the second web opposite the first web, a second intersection of the second flange and the second web being curved;

a cap connecting the first web and the second web, the cap being curved and forming a curved hat shape for the stiffener, and wherein the first flange, the first web, the second flange, the second web, and the cap form a continuous structure; and a stiffener end of the stiffener, the stiffener end having an end face, the end face characterized by:

the first web and the second web initially extending at about a ninety degree angle from the plane, the end face then transitioning via corners having a first radius of curvature to a linear region comprising two side edges, the two side edges sloped with respect to the first web and the second web at a third angle less than ninety degrees, the two side edges meeting the cap at an end termination that is generally U-shaped.

2. The stiffener of claim 1 wherein said stiffener comprises a multi-laminated composite structure.

3. The stiffener of claim 2 wherein said multi-laminated composite structure comprises at least one tape ply and at least one fabric ply.

4. The stiffener of claim 3 wherein said at least one tape ply comprises ten tape plies and said at least one fabric ply comprises two fabric plies.

5. The stiffener of claim 1, wherein the end termination comprises a concave termination upper edge continuous with the two side edges.

6. A composite assembly, comprising:

a composite structure; and at least one stiffener, each of the at least one stiffener comprising:

a first flange disposed on the composite structure;

a first web extending at a first angle from the first flange away from the composite structure, a first intersection of the first flange and the first web being curved;

a second flange disposed on the composite structure opposite the first flange, the first flange and the second flange forming a plane;

a second web extending at a second angle from the second flange away from the composite structure, the second web opposite the first web, a second intersection of the second flange and the second web being curved;

a cap connecting the first web and the second web, the cap being curved and forming a curved hat shape for the stiffener, and wherein the first flange, the first web, the second flange, the second web, and the cap form a continuous structure; and a stiffener end of the stiffener, the stiffener end having an end face, the end face characterized by:

the first web and the second web initially extending at about a ninety degree angle from the plane, the end face then transitioning via corners having a first radius of curvature to a linear region comprising two side edges, the two side edges sloped with respect to the first web and the second web at a third angle less than ninety degrees, the two side edges meeting the cap at an end termination that is generally U-shaped.

7. The composite assembly of claim 6 wherein said at least one stiffener provided on said composite structure comprises a pair of stiffeners provided on said composite structure in generally parallel, spaced-apart relationship with respect to each other.

8. The composite assembly of claim 6 wherein each of the at least one stiffener comprises a multi-laminated composite structure.

9. The composite assembly of claim 8 wherein said multi-laminated composite structure comprises ten tape plies and at least one fabric ply wherein the at least one fabric ply comprises two fabric plies.

10. The composite assembly of claim 6 wherein the end termination comprises a concave termination upper edge continuous with the two side edges.

11. The composite assembly of claim 6 further comprising at least one fastener provided in said composite structure at the end termination.

12. The composite assembly of claim 6 further comprising:

a number of fasteners located within an interior of the stiffener, wherein the interior is defined by and between the first web, the second web, and the cap, and wherein, as a result of the two side edges being sloped, a stiffener interior entrance defined between the two side edges allows access to the number of fasteners.

* * * * *